US008359254B1

(12) United States Patent  
Groz

(10) Patent No.: US 8,359,254 B1  
(45) Date of Patent: Jan. 22, 2013

(54) NON-SCALAR-VALUED FINANCIAL INSTRUMENTS

(76) Inventor: Marc Michael Groz, Stamford, CT (US)

(*) Notice: Subject to any disclaimer, the term of this patent is extended or adjusted under 35 U.S.C. 154(b) by 0 days.

(21) Appl. No.: 12/701,373

(22) Filed: Feb. 5, 2010

Related U.S. Application Data

(63) Continuation-in-part of application No. 10/733,483, filed on Dec. 11, 2003, now abandoned.

(60) Provisional application No. 60/432,852, filed on Dec. 12, 2002.

(51) Int. Cl.
*G06Q 40/00* (2006.01)

(52) U.S. Cl. .................. 705/35; 705/38; 705/4

(58) Field of Classification Search ............ 705/35, 705/36, 36 R
See application file for complete search history.

(56) References Cited

U.S. PATENT DOCUMENTS

| | | | |
|---|---|---|---|
| 479,098 A | 7/1892 | Spencer | |
| 4,569,526 A | 2/1986 | Hamilton | |
| 4,856,788 A * | 8/1989 | Fischel | 273/256 |
| 5,940,801 A | 8/1999 | Brown | |
| 6,032,957 A | 3/2000 | Kiyosaki et al. | |
| 6,061,662 A | 5/2000 | Makivic | |
| 6,073,115 A | 6/2000 | Marshall | |
| 6,647,374 B2 | 11/2003 | Kansal | |
| 6,709,330 B1 | 3/2004 | Klein et al. | |
| 6,729,884 B1 * | 5/2004 | Kelton et al. | 434/236 |
| 6,918,769 B2 | 7/2005 | Rink | |
| 6,939,137 B1 * | 9/2005 | Colaio et al. | 434/107 |
| 2001/0042037 A1 | 11/2001 | Kam et al. | |
| 2001/0049651 A1 | 12/2001 | Selleck | |
| 2002/0019799 A1 | 2/2002 | Ginsberg | |
| 2002/0156709 A1 | 10/2002 | Andrus et al. | |

FOREIGN PATENT DOCUMENTS

WO WO 01/80143 AS 10/2001

OTHER PUBLICATIONS

The impact of alternative high-fidelity simulation methods on learner achievement, attitude, and development cost. Wawrykowicz, Stephanie R. Wayne State University, Jul. 2009.*
Indianapolis 'Tour de Finance' for Personal Investor Debuts. PR Newswire, Jan. 2004.*
BISYS(R) Announces Enhanced Version of Nasdaq Head Trader. PR Newswire, Jan. 2000.*
"Complex Numbers", Wikipedia, The free encyclopedia, last modified on Mar. 14, 2009, last viewed Mar. 17, 2009, Wikimedia Foundation, Inc. USA.
"Scalar (mathematics)", Wikipedia, The free encyclopedia, last modified on Feb. 14, 2009, last viewed Mar. 17, 2009, Wikimedia Foundation, Inc. USA.
"Vector space", Answers.com, The American Heritage Dictionary of The English Language, Fourth Edition, Copyright 2004 and Wikipediat article Vector Space last viewed Dec. 4, 2005.
"Surreal number", Wikipedia, The free encyclopedia, last modified on Nov. 30, 2005, last viewed Dec. 4, 2005, Wikimedia Foundation, Inc. USA.

* cited by examiner

*Primary Examiner* — Kelly Campen
*Assistant Examiner* — John Preston
(74) *Attorney, Agent, or Firm* — Amster, Rothstein & Ebenstein LLP

(57) ABSTRACT

A method and system is disclosed for creating and using non-scalar valued financial instruments. The method and system addresses the problems caused by limited the value of financial instruments to scalar quantities. Applications of the method and system include recreation, education, therapeutic intervention, and finance.

1 Claim, 4 Drawing Sheets

NON-SCALAR-VALUED FINANCIAL INSTRUMENTS

CROSS REFERENCE TO RELATED APPLICATION

This application is a continuation in part of U.S. nonprovisional patent application entitled "Non-scalar-valued Financial Instruments", Ser. No. 10/733,483, filed Dec. 11, 2003 now abandoned. Said application is incorporated herein by reference.

Application Ser. No. 10/733,483, in turn claims priority to U.S. provisional patent application No. 60/432,852, filed Dec. 12, 2002. Said application is incorporated herein by reference.

BACKGROUND OF THE INVENTION

By scalar-valued financial instrument ("SFI") I mean a financial instrument whose value is completely represented as a magnitude of a currency. Note that the value of an SFI may be unknown, subject to measurement error, or valued differently at different times and places and by different people ("value assessors"). Nonetheless, despite disagreements, uncertainties, and variability in value, a scalar-valued financial instrument has, by definition, a unique value in a given context. The context of a valuation may include time, place, value assessor, actual owner, hypothetical owner, other interested parties, or other relevant factors such as interest rates, exchange rates, and other financial or economic variables.

SFIs may be real or imaginary:
A real SFI is an SFI whose value is completely represented in a real currency, e.g., U.S. dollars. Examples of real SFIs include, United States Savings Bonds, shares of common stock in a corporation, and IOUs. Currencies such as euros, dollars, and yen are themselves special kinds of real SFIs.
An imaginary SFI is an SFI whose value is represented in an imaginary currency. An imaginary currency is a currency with no actual value that may be used to play a game. An example is the currency used to play the game of Monopoly®. Financial instruments denominated in "Monopoly money" or some other "play money" would be examples of imaginary SFIs.

All existing financial instruments are scalar-valued:
Commerce and games that are played for money use real currencies or other real SFIs.
Other games sometimes use imaginary SFIs, typically "play money."

Considered as commodities, games are purchased and sold using real currencies. In particular, "play money" may be bought or sold with real money. More generally, real SFIs may be traded for imaginary SFIs.

There are several contexts in which it would be useful to have a different type of financial instrument that extends the concept of financial instrument beyond the realm of scalar values. As explained in the next section, these contexts include:
Education
Rehabilitation
Recreation
Commerce Scalar values are enormously useful, enabling global commerce and providing a method of score-keeping in games that use either real money or play money. Nonetheless, value is not always adequately represented in scalar terms; values don't always line up on a single scale.

Human abilities to imagine, to simulate, or to create virtual worlds are examples of contexts in which non-scalar values may operate. All humans have the ability to imagine, engaging in "what if" exercises of varying degrees of sophistication and likelihood. The scalar model of value forces us to segregate our imagination from the world. This results in a misrepresentation of the relationship between the virtual and the real, with enormous consequences for our health and well-being, and for the health and well-being of those around us.

By reconnecting the domain of imaginary values with the domain of real values, and extending such domains to even more elaborate structures, we will be able to capture much more of the complexity of the world than we do at present. Such structures can help us learn better, overcome bad habits, and can act as a spur to creativity and economic growth.

BRIEF SUMMARY OF THE INVENTION

We may define a non-scalar-valued financial instrument ("NFI") as a financial instrument whose value is not completely represented by a magnitude in a currency. A class of NFIs is categorized by reference to a corresponding non-scalar value structure.

Following are examples of some instrument classes and associated value structures:
Surreal-valued financial instruments, whose value is a surreal number (as defined in On Numbers and Games, John H. Conway, 2001, $2^{nd}$ edition).
(Value Structure: Class $N_O$ of Surreal Numbers)
Complex-valued financial instruments, whose value is of the form A+Bi, where A, B are real numbers and i is the square root of $-1$.
(Value Structure: Field of Complex Numbers)
Vector-valued financial instruments, whose value is of the form AX, where $A=\{a_1, \ldots, a_n\}$ is a real vector and $X=\{x_1, \ldots, x_n\}$ is a set of unit vectors.
(Value Structure: Vector Space of Dimension n)
Tensor-valued financial instruments, whose value is of the form $A_{x1 \ldots xn}$ where A is a tensor of rank n with indices $x_1, \ldots, x_n$.
(Value Structure: Vector Space of Dimension n)

BRIEF DESCRIPTION OF THE DRAWINGS

The above summary of the invention will be better understood when taken in conjunction with the following detailed description and accompanying drawings in which.

DETAILED DESCRIPTION OF THE INVENTION

As referred to herein, games may include (without limitation) board games, online individual games, online multi-player games, individual and team sports, and games that are played for prizes in the form of money or other financial consideration.

As referred to herein, financial instruments may include (without limitation): equity securities; debt securities; hybrid securities; derivative securities; private placements; other instruments (registered or unregistered) subject to securities law; commodities contracts; futures contracts; insurance contracts; other private contracts; currencies of sovereign nations; and currencies of other entities such as the European Union.

In a preferred embodiment, an NFI may be represented or identified with one or more physical certificates, which may, for example and without limitation, be made of paper, plastic, or other appropriate material. Said NFI may have information printed or otherwise attached to the physical certificate.

In a preferred embodiment, a complex-valued NFI may have its value, in Cartesian and/or polar coordinates, printed on one or both sides of a paper certificate; a vector-valued NFI may be represented or identified with a set of papers, one for each unit vector of the canonical basis of the associated vector space.

In an alternative preferred embodiment, an NFI may be represented or identified with one or more components of a computer system. Said computer system may (for example and without limitation) be electronic, optical, DNA-based, or a quantum computer capable of operations using quantum bits (qubits) and entangled quantum states.

In a preferred embodiment, a surreal-valued NFI may be represented by a program whose output corresponds to the surreal number associated with said NFI; a tensor-valued NFI may be represented by a data file corresponding to the tensor associated with said NFI.

A preferred embodiment for operation and use of the invention for recreation is now described in connection with FIG. 1.

Figure 1:
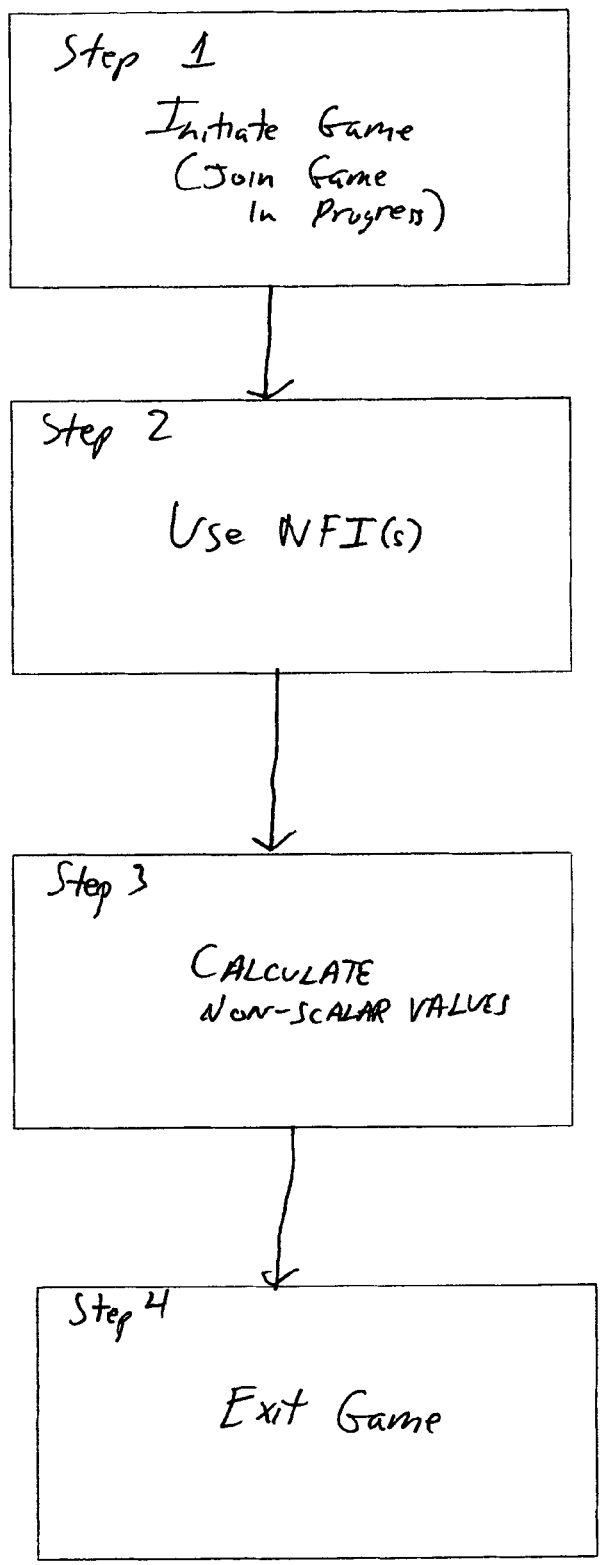
FIG. 1 is a flow chart of a preferred embodiment of the operation and use of the invention for recreation.

As shown in FIG. 1, step 1, one or more players initiate a game (or join a game already in progress). In step 2, one or more players uses one or more NFIs in the course of play. In step 3, the value of one or more NFIs is calculated one or more times in relationship to the playing of the game. In step 4, one or more players exits the game.

In a preferred embodiment, surreal, complex, vector or tensor-valued currencies or other financial instruments may be used for recreation.

Surreal numbers may be defined in terms of strength of position in one or more games (cf. Conway, 2001). Surreal-valued NFIs may have the value of the strength of position in one or more games associated with the NFI. Using said NFI, players may engage in simultaneous play of a plurality of games by playing one "meta-game" which may use said NFI to keep score.

Complex numbers consist of real and imaginary parts. Complex-valued NFIs may be used to play games in which the real and imaginary components operate independently. They may also be used to play games in which the real and imaginary components interact. Using said NFIs, players may engage in games in which both real and imaginary values change hands, and in which the relationship between the magnitude of said real and imaginary values may change during the course of play.

Vector or tensor-valued NFIs may be used to play games in which their respective units operate independently or interact. Using said NFIs, players may engage in games in which a plurality of distinct values change hands, and in which the relationship between the magnitude of said plurality of distinct values may change during the course of play.

A preferred embodiment for operation and use of the invention for education is now described in connection with FIG. 2.

Figure 2:
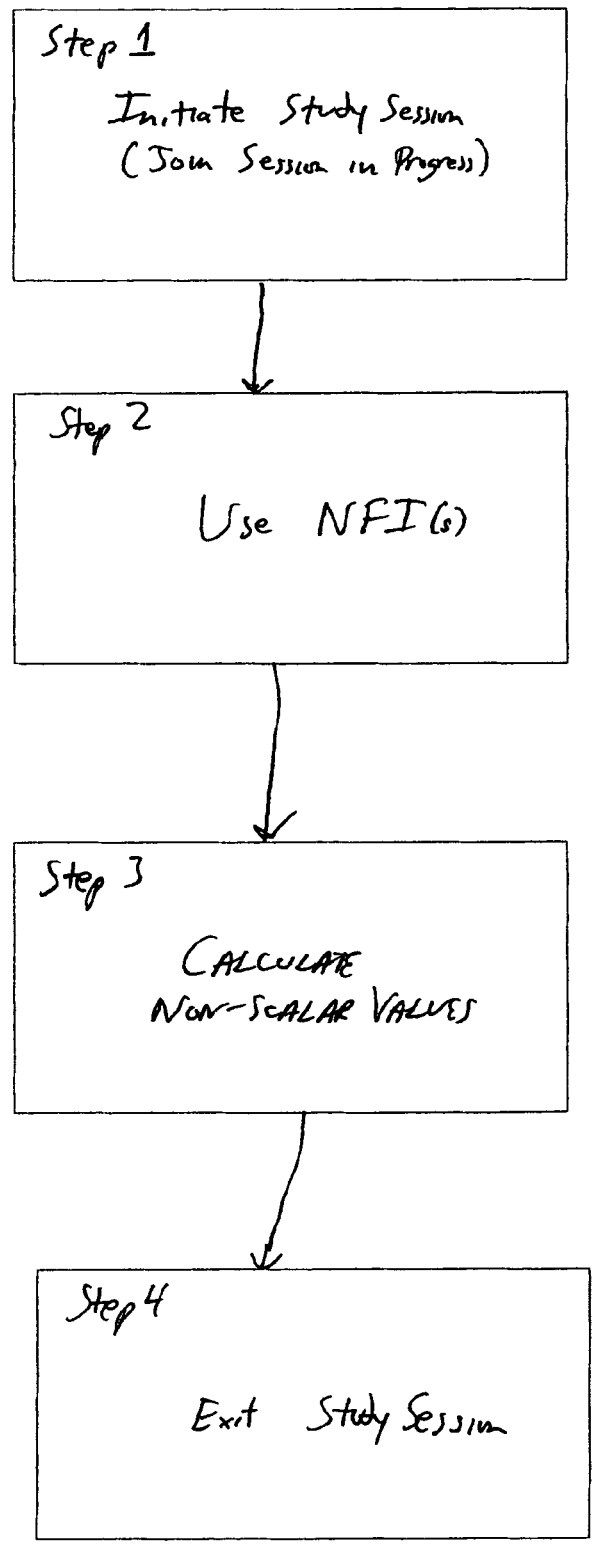
FIG. 2 is a flow chart of a preferred embodiment of the operation and use of the invention for education.

As shown in FIG. 2, step 1, one or more students and/or teachers ("learners") initiate a study session (or join a session already in progress). In step 2, one or more learners uses one or more NFIs in the course of study. In step 3, the value of one or more NFIs is calculated one or more times in relationship to the study session. In step 4, one or more learners exits the study session.

In a preferred embodiment, surreal, complex, vector or tensor-valued currencies or other financial instruments, may be used for education. Educational processes may be modeled in game-theoretic terms. For example, report cards and/or standardized test results may be linked to a set of currencies to create vector-valued financial instruments. One or more of the currencies may be associated with or convertible into real and/or imaginary currencies. Real currencies may preferably be used to fund scholarships and other educational stipends. Real and/or imaginary currencies may preferably be used to award prizes in educational games.

Surreal numbers may be defined in terms of strength of position in one or more games (cf. Conway, 2001). Surreal-valued NFIs may have the value of the strength of position in one or more games associated with the NFI. Using said NFI, players may engage in simultaneous play of a plurality of games by playing one "meta-game" which may use said NFI to keep score.

Complex numbers consist of real and imaginary parts. Complex-valued NFIs may be used to play games in which the real and imaginary components operate independently. They may also be used to play games in which the real and imaginary components interact. Using said NFIs, players may engage in games in which both real and imaginary values change hands, and in which the relationship between the magnitude of said real and imaginary values may change during the course of play.

Vector or tensor-valued NFIs may be used to play games in which their respective units operate independently or interact. Using said NFIs, players may engage in games in which a plurality of distinct values change hands, and in which the relationship between the magnitude of said plurality of distinct values may change during the course of play.

A preferred embodiment for operation and use of the invention for therapeutic intervention is now described in connection with FIG. 3.

Figure 3:
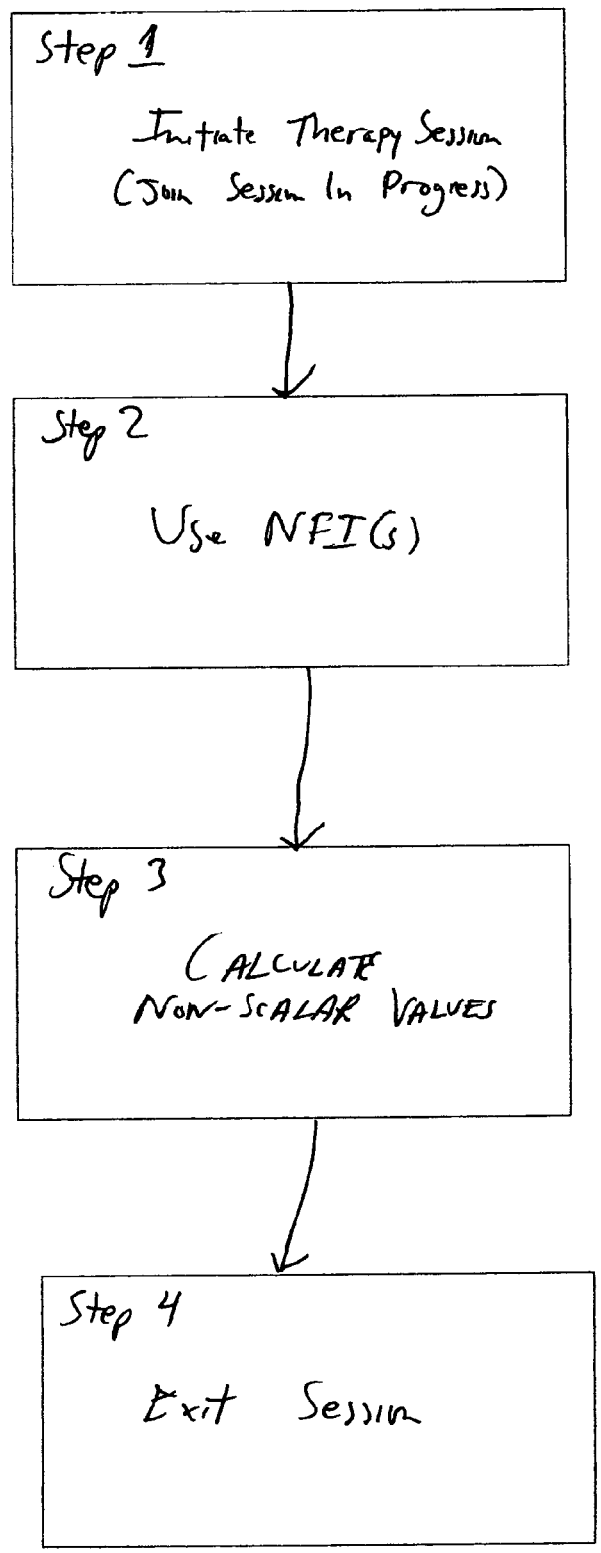
FIG. 3 is a flow chart of a preferred embodiment of the operation and use of the invention for therapeutic intervention.

As shown in FIG. 3, step 1, one or more patients and/or therapists initiate a therapeutic session (or join a session already in progress). In step 2, one or more patients and/or therapists uses one or more NFIs in the course of therapy. In step 3, the value of one or more NFIs is calculated one or more times in relationship to the therapy session. In step 4, one or more learners exits the therapy session.

In a preferred embodiment, surreal, complex, vector or tensor-valued currencies or other financial instruments, to be used for therapeutic intervention. Therapeutic interventions may be modeled in game-theoretic terms. For example, therapeutic evaluations and/or medical or psychological test results may be linked to a set of currencies to create vector-valued financial instruments. One or more of the currencies may be associated with or convertible into real and/or imaginary currencies. Real currencies may preferably be used to fund treatments and other therapeutic interventions. Real and/or imaginary currencies may preferably be used to award prizes in therapeutic games.

Surreal numbers may be defined in terms of strength of position in one or more games (cf. Conway, 2001). Surreal-valued NFIs may have the value of the strength of position in one or more games associated with the NFI. Using said NFI, players may engage in simultaneous play of a plurality of games by playing one "meta-game" which may use said NFI to keep score.

Complex numbers consist of real and imaginary parts. Complex-valued NFIs may be used to play games in which the real and imaginary components operate independently. They may also be used to play games in which the real and imaginary components interact. Using said NFIs, players may engage in games in which both real and imaginary values change hands, and in which the relationship between the magnitude of said real and imaginary values may change during the course of play.

Vector or tensor-valued NFIs may be used to play games in which their respective units operate independently or interact. Using said NFIs, players may engage in games in which a plurality of distinct values change hands, and in which the relationship between the magnitude of said plurality of distinct values may change during the course of play.

In a preferred embodiment, said NFIs may be used as part of a system for mitigating the financial and other consequences of addictive or compulsive gambling. For example, complex-valued NFIs may be issued to addictive or compulsive gamblers in the form of game cards, chips, or other tokens that may represent their value. The nature of the wager—in particular, the proportion of real value to imaginary value being wagered—may be automatically adjusted by the system managing play. The use of complex currency may help protect the gambler from the consequences of his or her compulsive or addictive behavior.

A preferred embodiment for operation and use of the invention for trading financial instruments is now described in connection with FIG. 4.

Figure 4:
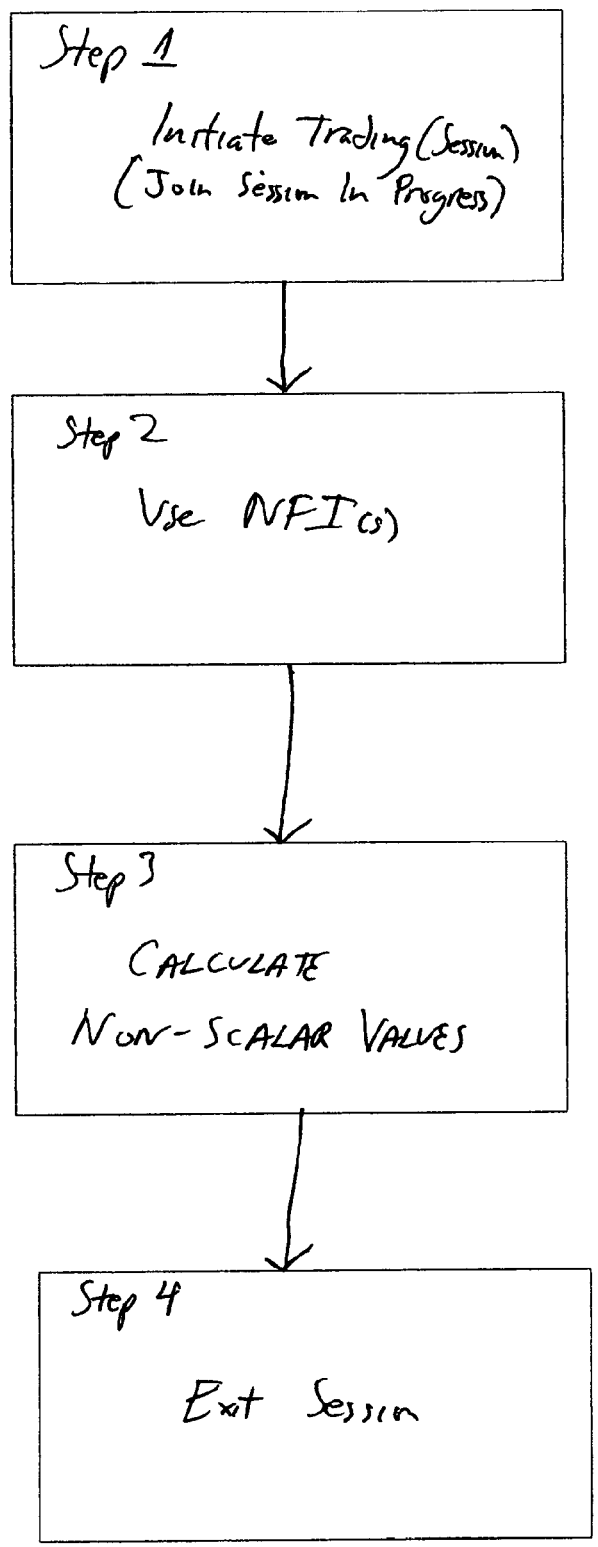
FIG. 4 is a flow chart of a preferred embodiment of the operation and use of the invention for trading financial instruments.

As shown in FIG. 4, step 1, one or more traders initiate a trading session (or join a session already in progress). In step 2, one or more traders uses one or more NFIs in the course of trading. In step 3, the value of one or more NFIs is calculated one or more times in relationship to the trading session. In step 4, one or more traders exits the study session.

In a preferred embodiment, surreal, complex, vector, or tensor-valued currencies or other financial instruments, are used for trading financial instruments. Financial instrument trading may be modeled in game-theoretic terms. Used in the context of a trading operation, NFIs may facilitate training of traders and other operations staff, risk management and mitigation, and testing and/or optimization of trading strategies.

Surreal numbers may be defined in terms of strength of position in one or more games (cf. Conway, 2001). Surreal-valued NFIs may have the value of the strength of position in one or more games associated with the NFI. Using said NFI, players may engage in simultaneous play of a plurality of games by playing one "meta-game" which may use said NFI to keep score.

Complex numbers consist of real and imaginary parts. Complex-valued NFIs may be used to play games in which the real and imaginary components operate independently. They may also be used to play games in which the real and imaginary components interact. Using said NFIs, players may engage in games in which both real and imaginary values change hands, and in which the relationship between the magnitude of said real and imaginary values may change during the course of play.

Vector or tensor-valued NFIs may be used to play games in which their respective units operate independently or interact. Using said NFIs, players may engage in games in which a plurality of distinct values change hands, and in which the relationship between the magnitude of said plurality of distinct values may change during the course of play.

In a preferred embodiment, training of traders may be facilitated by use of complex-valued NFIs. Managers or other parties may provide each trader with an absolute value V to be traded, along with a training parameter P. Different traders may be assigned different values for V and P. Each (V, P) corresponds to a complex-valued currency, expressed in polar coordinates (r, θ). Initially, P may be set to $\pi/2$ (90 degrees), meaning that the trader is trading a purely imaginary currency. Subsequently, P may be adjusted in accordance with said trader's trading results and preferably other factors, which may include market conditions and the firm's trading position. The trading results can be determined by monitoring the performance of the trader. The step of adjusting said training parameter may be automatically carried out at least in part on a computer specifically modified to process complex-valued transactions comprising both real and imaginary dimensions wherein said imaginary dimensions are in units of $\sqrt{-1}$.

Said trader's knowledge of the value of training parameter P may preferably be controlled by said managers or other parties. For training purposes, traders may agree to trade in complete ignorance of P's value. Said traders, may, for example, sometimes be given a random value for P.

In an alternative preferred embodiment, risk management may be facilitated by use of complex-valued NFIs. Risk managers or other parties may provide each trader with an absolute value V to be traded, along with a risk management parameter P. Different traders may be assigned different values for V and P. Each (V, P) correspond to a value of a complex-valued currency, expressed in polar coordinates (r, θ). Initially, P may be set to $\pi/2$ (90 degrees), meaning that the trader is trading a purely imaginary currency. Subsequently, P may be adjusted in accordance with risk management criteria and preferably other factors, which may include the trader's results, market conditions and the firm's trading position. The trader's results may be determined by monitoring the performance of said trader. Said trader's knowledge of the value of risk management parameter P may preferably be controlled by said managers or other parties. For risk management purposes, traders may agree to trade in complete ignorance of P's value. Said traders, may, for example, sometimes be given a random value for P.

In another alternative preferred embodiment, testing and optimization of trading strategies may be facilitated by use of complex-valued NFIs. Quantitative strategists or other parties may provide each trader with an absolute value V to be traded, along with a training parameter P. Different traders may be assigned different values for V and P. Each (V, P) correspond to a value of a complex-valued currency, expressed in polar coordinates (r, θ). Initially, P may be set to $\pi/2$ (90 degrees), meaning that the trader is trading a purely imaginary currency. Subsequently, P may be adjusted in accordance with testing and/or optimization criteria and preferably other factors, which may include the trader's results, market conditions and the firm's trading position. Said trader's knowledge of the value of parameter P may preferably be controlled by said managers or other parties. For testing and optimization purposes, traders may agree to trade in complete ignorance of P's value. Said traders, may, for example, sometimes be given a random value for P.

I claim:

1. A method for trading financial instruments, the method comprising:
   a. providing a database stored on one or more computer readable media and accessible by one or more computers comprising data for one or more traders including for each respective trader:
      i. a trading value of currency authorized to be traded by the respective trader;
      ii. a training value of currency authorized to be traded by the respective trader; and
      iii. an absolute value of currency authorized to be traded by the respective trader wherein the absolute value is a function of the trading value of currency associated with the respective trader and the training value of currency associated with the respective trader;
   b. sending from the one or more computer systems to a trader system associated with the respective trader the absolute value of currency associated with the respective trader;
   c. receiving from the trader system at the one or more computer systems a first financial trade to be performed;
   d. authorizing by the one or more computer systems the first financial trade to be performed based on at least the first trade value of the first financial trade being less than or equal to the absolute value for the respective trader;
   e. determining by the one or more computer systems a first actual trade value of the first financial trade as a function of the first trade value, the absolute value for the respective trader, and at least one of the training value for the respective trader and the trading value for the respective trader;
   f. authorizing by the one or more computer systems an actual financial transaction associated with the financial trade in the amount of the first actual trade value;
   g. executing or having executed the actual financial transaction in the value of the first actual trade value;
   h. sending to the trader system confirmation of a hypothetical financial trade in the amount of the first trade value; and
   i. sending to a manager system a report comprising the financial trade in the amount of the actual trade.

* * * * *